(12) United States Patent
Soares Da Silva et al.

(10) Patent No.: US 11,458,422 B2
(45) Date of Patent: Oct. 4, 2022

(54) MULTIPHASE SEPARATOR, AND METHOD OF SEPARATING A MULTIPHASE FLUID

(71) Applicant: PETRÓLEO BRASILEIRO S.A.—PETROBRAS, Rio de Janeiro (BR)

(72) Inventors: Fabricio Soares Da Silva, Petrópolis (BR); André Sampaio Monteiro, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 212 days.

(21) Appl. No.: 16/759,111

(22) PCT Filed: Oct. 26, 2018

(86) PCT No.: PCT/GB2018/053111
§ 371 (c)(1),
(2) Date: Apr. 24, 2020

(87) PCT Pub. No.: WO2019/081949
PCT Pub. Date: May 2, 2019

(65) Prior Publication Data
US 2020/0346140 A1 Nov. 5, 2020

(30) Foreign Application Priority Data
Oct. 26, 2017 (BR) .......................... 102017023118-6

(51) Int. Cl.
*C02F 1/24* (2006.01)
*B01D 21/02* (2006.01)
*B01D 17/02* (2006.01)
(Continued)

(52) U.S. Cl.
CPC ......... *B01D 21/10* (2013.01); *B01D 17/0205* (2013.01); *B01D 17/0211* (2013.01);
(Continued)

(58) Field of Classification Search
CPC ............ B01D 17/0205; B01D 17/0214; B01D 19/0042; B01D 19/0068; B01D 21/0006;
(Continued)

(56) References Cited

U.S. PATENT DOCUMENTS 3,121,680 A * 2/1964 Ciabattari ................. C02F 1/24
210/703
3,175,687 A * 3/1965 Jones ....................... C02F 1/24
210/221.2
(Continued)

FOREIGN PATENT DOCUMENTS

BR 8504487 A 4/1987
CN 202179882 U 4/2012
(Continued)

*Primary Examiner* — Christopher Upton
(74) *Attorney, Agent, or Firm* — Birch, Stewart, Kolasch & Birch, LLP

(57) ABSTRACT

The present invention provides a multiphase separator for separating a multiphase fluid produced by one or more oil wells, the multiphase separator comprising: a separating vessel, comprising an inlet chamber and an oil chamber for collecting oil at least partially separated by a barrier; an inlet for introducing the multiphase fluid into the separating vessel; wherein the oil chamber is positioned on the opposite side of the barrier to the inlet; a gas outlet configured to collect gas separated from the multiphase fluid; an oil outlet configured to collect oil, separated from the multiphase fluid, from the oil chamber; a water outlet configured to collect water separated from the multiphase fluid; and a gas
(Continued)

and water mixture injector configured to inject a mixture of pressurized gas and water in a lower portion of the separating vessel.

20 Claims, 2 Drawing Sheets

(51) Int. Cl.
*B01D 19/00* (2006.01)
*B01D 21/00* (2006.01)
*B01D 21/24* (2006.01)
*C02F 1/40* (2006.01)
*E21B 43/34* (2006.01)
*C02F 1/00* (2006.01)
*C02F 101/32* (2006.01)
*C02F 103/10* (2006.01)

(52) U.S. Cl.
CPC ..... *B01D 17/0214* (2013.01); *B01D 19/0068* (2013.01); *B01D 21/0006* (2013.01); *B01D 21/245* (2013.01); *B01D 21/2444* (2013.01); *B01D 21/2472* (2013.01); *B01D 21/2488* (2013.01); *C02F 1/24* (2013.01); *C02F 1/40* (2013.01); *E21B 43/34* (2013.01); *C02F 2001/007* (2013.01); *C02F 2101/32* (2013.01); *C02F 2103/10* (2013.01); *C02F 2301/046* (2013.01)

(58) Field of Classification Search
CPC ............ B01D 21/2444; B01D 21/2472; B01D 21/2488; C02F 1/24; C02F 1/40; E21B 43/34
USPC ............ 210/703, 803, 221.2, 523, 539, 540; 95/169, 186, 263; 96/183, 184; 166/75.12
See application file for complete search history.

(56) References Cited

U.S. PATENT DOCUMENTS

| | | | | |
|---|---|---|---|---|
| 3,623,608 | A | * | 11/1971 | Waterman .......... B01D 17/0205 210/221.2 |
| 5,484,534 | A | * | 1/1996 | Edmondson ....... B01D 17/0205 210/703 |
| 8,323,489 | B2 | | 12/2012 | Lee et al. |
| 2004/0222170 | A1 | * | 11/2004 | Hauge ................ B01D 21/2472 210/803 |
| 2010/0180769 | A1 | | 7/2010 | Grenstad et al. |
| 2013/0075338 | A1 | * | 3/2013 | Murtagh ............ B01D 17/0205 210/703 |
| 2014/0130676 | A1 | | 5/2014 | Daniels et al. |
| 2015/0260026 | A1 | | 9/2015 | Whitney et al. |
| 2015/0291444 | A1 | * | 10/2015 | Le Quesne ................ C02F 1/24 210/703 |
| 2015/0306520 | A1 | | 10/2015 | Grave et al. |
| 2019/0063203 | A1 | * | 2/2019 | Arefjord ............ B01D 17/0214 |

FOREIGN PATENT DOCUMENTS

| | | |
|---|---|---|
| WO | WO 2004/112936 A1 | 12/2004 |
| WO | WO 2005/107918 A1 | 11/2005 |
| WO | WO 2009/108063 A1 | 9/2009 |
| WO | WO 2013/043361 A1 | 3/2013 |

* cited by examiner

MULTIPHASE SEPARATOR, AND METHOD OF SEPARATING A MULTIPHASE FLUID

CROSS-REFERENCE TO RELATED APPLICATION

This application claims the benefit of priority to BR 10 2017 023118-6, filed 26 Oct. 2017, which is incorporated herein by reference in its entirety.

FIELD OF THE INVENTION

The present invention relates to technologies for primary separation of petroleum. More particularly, the present invention relates to a multiphase separator, such as first-stage separating vessels for primary separation of petroleum.

BACKGROUND OF THE INVENTION

The present disclosure relates to multiphase separators such as gravity separators used for primary three-phase fluid separation (oil-water-gas) as well as separation of any solids contained therein, both in the offshore environment (topside and subsea) and the onshore environment. This separation is necessary both for obtaining products of commercial interest, such as oil and gas, and for treating unwanted by-products, such as water and solid sediments.

A method of separation widely known from the prior art is so-called classical flotation, which uses addition of flocculants that act at the surface of small oil droplets, causing them to coalesce, and increasing the size of the flocs. Under the action of microbubbles of gas, which also become agglomerated with the floc, these flocs tend to rise to the surface and are separated more easily from the aqueous "core".

Normally the process described is carried out as the last step in the treatment of the water produced. However, it would be very interesting to anticipate this treatment, reducing the diameter of the cut of the gravity separators, and consequently increasing their efficiency.

In addition to the water and oil already described, petroleum production also comprises the presence of solid particles (sand, pipeline corrosion products, sediments, etc.) that tend to accumulate at the bottom of the first-stage separating vessels.

During processing and production of the petroleum, accumulation of solid particles causes problems associated with loss of residence time of the fluid, obstruction of outlet nozzles of the vessel, entrainment of the solid particles to other equipment of the process plant, erosion in equipment, blocking of valves, etc.

As is known from the prior art, removal of the solids from separating vessels may be performed in two ways: (i) in operation, by injecting water at high pressure at the bottom of the vessel (through injector nozzles), in which the water is responsible for conveying these solids, which are removed via the drainage nozzles of the separator; or (ii) during stoppages, whether or not programmed, when opening said vessel for cleaning.

The second form of cleaning requires stoppage of production, depressurization of the separator, drainage thereof, procedures for inerting, opening the vessel and manual cleaning. This operation, besides being slow, presents serious risks to the technicians involved in the process.

Thus, it would be very advantageous if a primary-flow gravity separator were to provide separation of oil and gas from water, besides providing cleaning of the separator tank by removing solid particles.

Document BR8504487A discloses an induced flow separator with ascending flow ejector, provided with a main separating tank receiving a continuous flow of fluid divided into a plurality of aeration chambers with each aeration chamber comprising ejecting means where gas is ejected in a stream of fluid.

According to the document, the gas injected adheres to the oil and dirt present in the stream of fluid and they are collected in a layer of foam. Cleaning of the water is thus provided.

Document U.S. Pat. No. 8,323,489B2 discloses a tank for treating water intended for removing immiscible fluids (oil) from contaminated water, in order to produce clean water, comprising a chamber, an injection line, a unit for generating bubbles, tank of immiscible fluid, and a clean water outlet.

In one configuration described, the tank is divided into chambers connected by connecting pipes, wherein these pipes comprise means for injection of bubbles (gas).

Document WO2013043361A1 relates to an induced gas separating vessel, used for removing the entrained oil from a stream of produced water, which comprises a produced water inlet, an oil outlet, a treated water outlet and a set of gas eductors.

According to WO2013043361A1, the main advantage of the device described consists of using gas eductors positioned in the lowest portion of the vessel, so that the gas bubbles become attached to the oil particles dispersed in the water, so that the oil floats, facilitating its removal from the water.

Document WO2005107918A1 relates to a separator of multiphase fluids that comprise oil, water and gas phases, comprising a collector for collecting the liquid phase, an outlet for extracting the gas phase, and a drainage circuit for draining the liquid phase from the separator.

The separator described further comprises a flotation assembly able to float at the gas/liquid interface so that the collector is positioned in the region of the gas/liquid emulsion. In this region, the liquid present is oil-rich, therefore the collector collects oil from this region, so that water is collected in the lower region of the device and gas from the upper region.

It should be noted that this document does not make any reference to the use of dispersers for reinjecting part of the gas collected in the device to assist treatment of the injected stream, or use of part of the water collected for cleaning the device.

Document WO2004112936A1 relates to a system for separating oil and/or oil-coated solids from an oil/water mixture. The system includes a vertical vessel that has an inlet for introducing a fluid to be treated. The vessel also has a water outlet in a lower portion and an oil outlet in an intermediate portion.

The document also describes positioning an eductor in a lower portion of the treatment vessel, arranged for scattering small gas bubbles radially in a uniform horizontal pattern over the whole area of the cross-section of the vessel. These bubbles float up against the descending flow of oily water inside the vessel and bind to droplets of oil and/or oil-coated solids, increasing their floatability and thus increasing the separation of oily contaminants from the water.

It is additionally described that the water and the gas used by the eductor are recycled from said treatment device, i.e. are withdrawn via the collecting lines and reinjected by the inductor to optimize the process of treatment of the fluid in question.

It is therefore noted that the prior art lacks a system for treatment/separation of the primary petroleum stream that also provides cleaning of the tank of the treatment system, providing an intermittent fluid treatment process, without the need to stop the production process to carry out tank cleaning.

As will be described in more detail below, the present invention aims to solve the problems of the prior art described above in a practical and efficient manner.

SUMMARY OF THE INVENTION

The present disclosure provides a system for primary separation of petroleum that makes it possible to carry out periodical cleaning of the separating vessel without needing to open the vessel, and promote flotation of the oil droplets in the water, increasing the separation efficiency of the separating vessels and reducing the need for water treatment equipment downstream.

According to a first aspect of the invention, there is provided a multiphase separator for separating a multiphase fluid produced by one or more oil wells, the multiphase separator comprising one or more of: a separating vessel, comprising an inlet chamber and an oil chamber for collecting oil at least partially separated by a barrier; an inlet for introducing the multiphase fluid into the separating vessel; wherein the oil chamber is positioned on the opposite side of the barrier to the inlet; a gas outlet configured to collect gas separated from the multiphase fluid; an oil outlet configured to collect oil, separated from the multiphase fluid, from the oil chamber; a water outlet configured to collect water separated from the multiphase fluid; and a gas and water mixture injector configured to inject a mixture of pressurized gas and water in a lower portion of the separating vessel.

Optionally, the multiphase separator further comprises: a solids collection system for collecting solid material deposited at the bottom of the separating vessel; and/or a cleaning system configured to inject pressurized water in a downward angled direction towards the bottom of the separating vessel to direct a swept flow of water to the solids collection system.

Optimally, the multiphase separator further comprises a water recycling line configured to receive water from the water outlet and to supply the received water to the cleaning system.

Optionally, the gas outlet comprises a gas recycling line connected to the gas and water mixture injector.

Optionally, the gas recycling line comprises a gas recycling valve configured to control the flow of recycled gas to control the volume of gas to be fed back into the separating vessel.

Optionally, the gas outlet comprises a gas outlet line.

Optionally, the gas outlet line comprises a gas outlet control valve configured to control the internal pressure of the separating vessel.

Optionally, the barrier extends from the bottom of the separating vessel up to an intermediate height within the vessel.

Optionally, the water outlet comprises a water outlet line.

Optionally, the water outlet comprises a water recycling line configured to recycle water to the gas and water injector.

Optionally, the water recycling line comprises a water recycling control valve.

Optionally, the multiphase separator further comprises a pump connected to the gas recycling line and to the water recycling line.

Optionally, the pump is configured to impart pressure to flows intended for the gas and water mixture injector, and for the cleaning system.

Optionally, the gas and water mixture injector comprises sprinklers and/or injector nozzles.

Optionally, the gas and water mixture injector comprises at least one line of sprinklers.

Optionally, the multiphase separator further comprises a mixture flow control valve configured to control the flow supplied to the gas and water mixture injector.

Optionally, the multiphase separator further comprises a cleaning flow control valve configured to control the flow supplied to the cleaning system.

Optionally, the cleaning system comprises at least one pipeline provided with a plurality of injector nozzles angled downwards for injecting high-pressure water.

Optionally, the solids collection system comprises a collecting channel.

Optionally, the collecting channel comprises one or more injector nozzles for propelling solids collected in the channel.

According to a second aspect of the invention, there is provided a method of separating a multiphase fluid produced in one or more oil wells comprising one or more of the steps of: introducing the multiphase fluid into a separating vessel; collecting gas, separated from the multiphase fluid, from an upper part of the separating vessel; separating oil from the multiphase fluid into an oil chamber, and collecting the oil; and collecting water separated from the multiphase fluid; injecting a pressurized mixture of gas water in a lower portion of the separating vessel.

Optionally, the step of injecting comprises injecting a pressurized mixture of at least some of the collected gas and at least some of the collected water.

Optionally, the method further comprises one or more of the steps of: injecting pressurized water in a downward angled direction towards a bottom of the separating vessel; and collecting solid material deposited at the bottom of the separating vessel.

Optionally, the water injected in a downward angled direction is at least some of collected water.

Optionally, the separating vessel is part of the multiphase separator of the first aspect.

According to a third aspect of the invention, there is provided a first-stage multiphase separator for separating a multiphase fluid produced in one or more oil wells comprising: a separating vessel; means for introducing the multiphase fluid into the separating vessel; an oil chamber positioned in a position opposite the means for introducing the multiphase fluid into the separating vessel; means for collecting a volume of gas separated from the multiphase fluid in an upper part of the separating vessel; means for collecting a volume of oil separated from the multiphase fluid in the oil chamber; and means for collecting a volume of water separated from the multiphase fluid in a lower part of the separating vessel; wherein the separator further comprises a means for injecting a mixture of pressurized gas and water in a lower portion of the separating vessel.

According to a fourth aspect of the invention, there is provided a method of separating a multiphase fluid produced in an oil well comprising the steps of: introducing the multiphase fluid into a separating vessel; collecting a volume of gas separated from the multiphase fluid in an upper part of the separating vessel; collecting a volume of oil separated from the multiphase fluid in an intermediate part of the separating vessel; collecting a volume of water separated from the multiphase fluid in a lower part of the separating vessel; and injecting a mixture of pressurized collected gas and collected water in a lower portion of the separating vessel.

According to a fifth aspect of the invention, there is provided a first-stage multiphase separator for separating a multiphase fluid produced in an oil well comprising: a separating vessel (3); means for introducing the multiphase fluid (2) into the separating vessel; an oil chamber (31) positioned in a position opposite the means for introducing the multiphase fluid (2) into the separating vessel (3); means for collecting a volume of gas (1) separated from the multiphase fluid in an upper part of the separating vessel (3); means for collecting a volume of oil (4) separated from the multiphase fluid in the oil chamber (31); and means for collecting a volume of water (5) separated from the multiphase fluid in a lower part of the separating vessel (3); the multiphase separator being characterized in that it comprises: means for injecting a mixture of pressurized gas and water (7) in a lower portion of the separating vessel (3).

Optionally, the multiphase separator is characterized in that it comprises: means for injecting pressurized water in a downward angled direction (8) in the lower portion of the separating vessel (3); and means for collecting solid material deposited in the lower part of the separating vessel.

Optionally, the water injected is water collected by the means for collecting a volume of water (5) separated from the multiphase fluid in the lower part of the separating vessel.

Optionally, the means for introducing the multiphase fluid (2) into a separating vessel (3) is an inlet line for multiphase fluids.

Optionally, the means for collecting a volume of gas (1) separated from the multiphase fluid in an upper part of the separating vessel (3) comprises: a gas outlet line (11); and a gas recycling line (10) connected to the means for injecting a mixture of pressurized gas and water (7) in a lower portion of the separating vessel.

Optionally, the gas outlet line (11) may comprise a control valve (13) suitable for controlling the internal pressure of the separating vessel (3).

Optionally, the gas recycling line (10) comprises a valve (12) for controlling the flow of recycled gas to control the volume of gas to be fed back into the separating vessel (3).

Optionally, the multiphase separator comprises an oil chamber (31) positioned opposite the inlet of the multiphase flow (2) and defined by a physical barrier (30) from a lower position of the separating vessel 3 up to an intermediate position of the vessel 3.

Optionally, the means for collecting a volume of water (5) separated from the multiphase fluid in a lower part of the separating vessel (3) comprises a water outlet line (50) and a line (51) for recycling water to the means for injecting a mixture of pressurized gas and water (7) in a lower portion of the separating vessel (3), wherein the water recycling line (51) comprises a water flow control valve (52).

Optionally, the multiphase separator comprises an inductor pump (6) connected to the gas recycling line (10) and to the water recycling line (51), wherein the inductor pump (6) is suitable for imparting pressure to the flow intended for the means for injecting a mixture of pressurized gas and water (7) in a lower portion of the separating vessel (3), and for the means for injecting pressurized water in a downward angled direction (8) in the lower portion of the separating vessel.

Optionally, the means for injecting a mixture of water and gas (7) comprises at least one of sprinklers and injector nozzles.

Optionally, the means for injecting a mixture of pressurized gas and water (7) comprises at least one line (72) comprising sprinklers (71).

Optionally, the multiphase separator comprises a flow control valve (70) suitable for controlling the flow supplied to the means for injecting a mixture of pressurized gas and water (7) in a lower portion of the separating vessel (3).

Optionally, the multiphase separator comprises a flow control valve (80) suitable for controlling the flow supplied to the means for injecting pressurized water in a downward angled direction (8) in the lower portion of the separating vessel (3).

Optionally, the means for injecting pressurized water in a downward angled direction (8) of the lower portion of the separating vessel (3) comprises at least one pipeline (82) provided with a plurality of injector nozzles of high-pressure water angled downwards.

Optionally, the means for collecting solid material deposited in the lower part of the separating vessel comprises a collecting channel, wherein the collecting channel comprises a plurality of further injector nozzles.

According to a sixth aspect of the invention, there is provided a method of separating a multiphase fluid produced in one or more oil wells comprising one or more of the steps of: introducing the multiphase fluid into a separating vessel; collecting a volume of gas separated from the multiphase fluid in an upper part of the separating vessel; collecting a volume of oil separated from the multiphase fluid in an intermediate part of the separating vessel; and collecting a volume of water separated from the multiphase fluid in a lower part of the separating vessel; the method being characterized in that it comprises the step of: injecting a pressurized collected gas mixture and pressurized collected water in a lower portion of the separating vessel.

Optionally, the method comprises one or more of the steps of: injecting pressurized water in a downward angled direction of the lower portion of the separating vessel; and collecting solid material deposited in the lower portion of the separating vessel.

Optionally. the water injected is water collected in the lower part of the separating vessel.

BRIEF DESCRIPTION OF THE FIGURES

The detailed description presented hereunder refers to the appended figures and their respective reference numbers.

DETAILED DESCRIPTION OF THE INVENTION

Firstly, it is emphasized that the following description will be based on a preferred embodiment of the invention. As will be obvious to a person skilled in the art, however, the invention is not limited to this particular embodiment.

Figure 1:
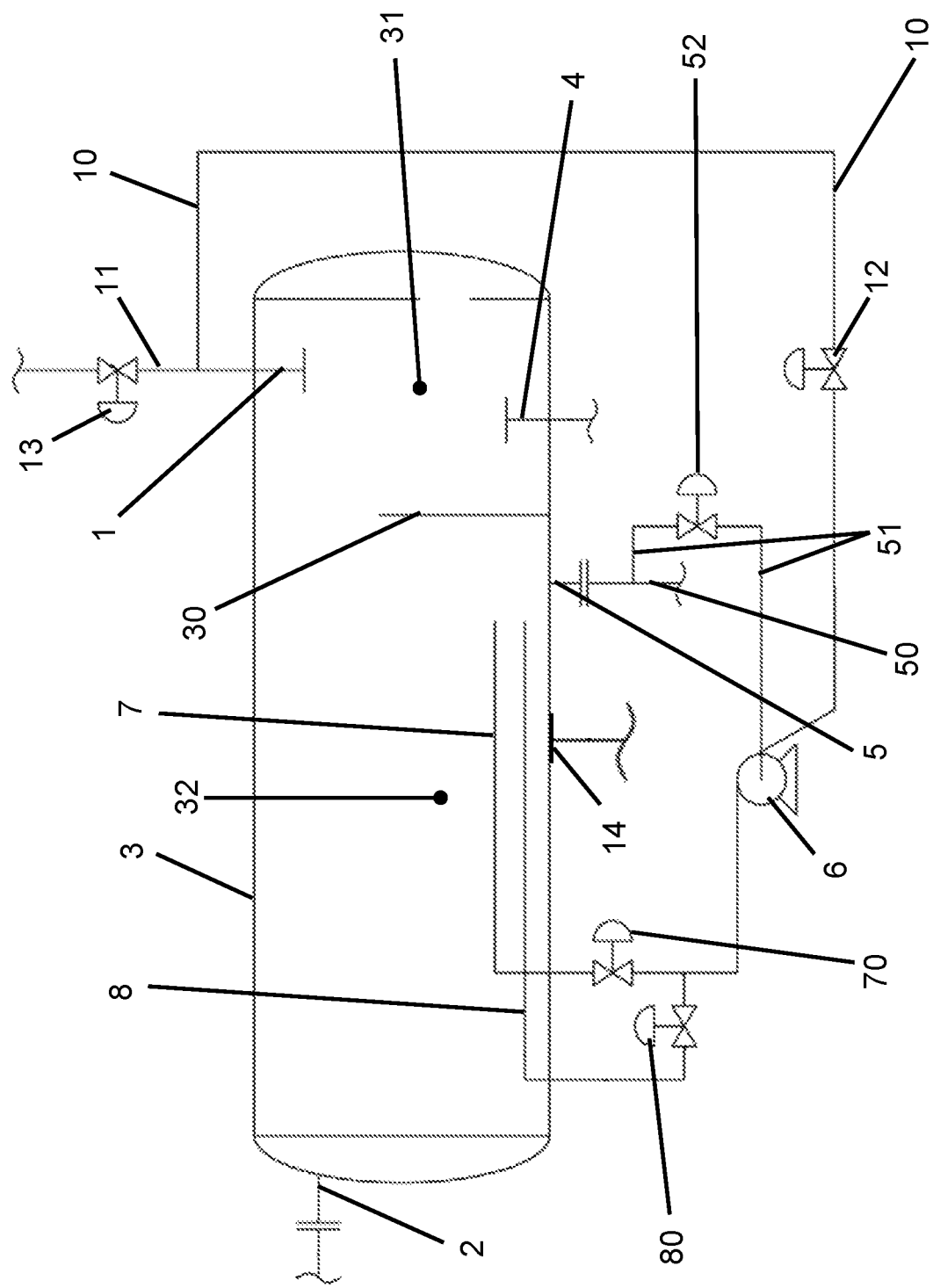
FIG. 1 shows schematically a multiphase separator according to an optional configuration.

FIG. 1 shows schematically a multiphase separator such as a first-stage multiphase separator. This separator is intended for separating a multiphase fluid. Such a fluid may be produced in one or more oil wells.

As is well known, the fluids produced in oil wells comprise at least three phases of immiscible fluids, namely a gas phase, an aqueous phase and an oil phase, and the fluids normally also have a number of solid particles mixed within them.

As detailed in earlier sections of this specification, to expedite the treatment of the fluid produced, the three phases (gas, oil and water) can be separated, and the solid particles removed.

The multiphase separator of FIG. 1 is provided with a separating vessel 3; having a means for introducing the multiphase fluid 2 into the separating vessel 3, such as an inlet. Internally, the separating vessel has an oil chamber 31 and an inlet chamber 32. Oil chamber 31 is positioned in a position opposite the inlet 3. A means for collecting a volume of gas 1 separated from the multiphase fluid, such as a gas outlet, is provided in or connected to an upper part of the separating vessel 3. A means for collecting a volume of oil 4 separated from the multiphase fluid, such as an oil outlet is provided in or connected to the oil chamber 31. A means for collecting a volume of water 5 separated from the multiphase fluid, such as a water outlet, is provided in or connected to a lower part of the separating vessel 3.

In order to optimize the separation of the three fluid phases, the multiphase separator further comprises a means for injecting a mixture of pressurized gas and water 7, such as a gas and water mixture injector. The injector 7 can be positioned in and/or inject into a lower portion of the separating vessel 3. By way of examples, the means for injecting a mixture of water and gas 7 can comprise sprinklers or injector nozzles.

For operation of the system, the multiphase fluids produced in the oil wells are initially combined in a production manifold (not shown). After heating, these fluids are introduced into the separating vessel 3 via the inlet or other means for introducing the multiphase fluid 2 into the separating vessel. The means for introducing the multiphase fluid into a separating vessel can be an inlet line for multiphase fluids.

Once the fluids have been introduced into the separating vessel 3, into the inlet chamber 32, initial separation of the phases takes place. The gas phase will tend to separate from the multiphase fluid and stratify into the upper part of the vessel 3. As the oil phase has a lower density than the water, it will be concentrated and stratify into a middle zone of the vessel 3. In its turn, the aqueous phase will stratify and accumulate in a lower part of the vessel 3.

The means for collecting a volume of gas 1 separated from the multiphase fluid is positioned in or connected to an upper part of the separating vessel 3 (e.g. the top of the separating vessel 3) and can comprise a gas outlet line 11 and a gas recycling line 10. The gas recycling line 10 can be connected to the means for injecting a mixture of pressurized gas and water 7 in a lower portion of the separating vessel.

The gas outlet line 11 may comprise a control valve 13. The control valve 13 may be suitable for controlling the internal pressure of the separating vessel 3.

The gas stream extracted via the gas outlet line can be sent for subsequent treatment, by any method known in the prior art.

On the other hand, the gas recycling line 10 is responsible for directing the gas recovered from the separating vessel 3 to be fed back into the separating vessel 3 by the means for injecting a mixture of pressurized gas and water 7. The gas recycling line 10 may also comprise a gas recycling valve 12 for controlling the flow of recycled gas. This valve 12 may control the volume of gas to be fed back into the separating vessel 3.

As described above, the oil phase will become concentrated and stratify in the middle zone of the separating vessel 3 and enters the oil chamber 31 from there, as discussed below. The concentration and stratification can be assisted by operating the separation vessel in a flotation mode, as also discussed below. In the oil chamber 31, the means for collecting a volume of oil 4 separated from the multiphase fluid is responsible for withdrawing oil from the separating vessel 3. The oil is then sent for subsequent treatment.

The oil chamber 31 is positioned in a position opposite the inlet of the multiphase stream 2 and is defined by a physical barrier 30 (or wall). That is the barrier 30 separates the inlet chamber 32 from the oil chamber 31. In other words, the oil chamber 31 is positioned on the opposite side of the barrier 30 to the inlet 2. The barrier can extend from a lower position of the separating vessel (i.e. the bottom of the separating vessel) up to an intermediate position of the vessel. As a result, oil accumulating in the middle zone of the inlet chamber 32 will overflow the barrier and is collected in the oil chamber 31. This allows the oil to be reliably collected from the oil chamber 31, even if the stratification interface between the water and the oil in the inlet chamber 32 varies in height. Of course, a person skilled in the art will be able to define the details of the configurations of the barrier 30, so that this does not represent a factor limiting the invention described.

Optionally, the means for collecting a volume of water 5 separated from the multiphase fluid can be positioned in or attached to a lower part of the separating vessel 3. That is, the water outlet 5 can be at the bottom of the separating vessel 3. The water outlet 5 can be in the inlet chamber.

The water outlet 5 can comprise a water outlet line 50 and a line 51 for recycling water. The water recycling line 51 can be arranged to recycle water to the means for injecting a mixture of pressurized gas and water 7 in a lower portion of the separating vessel 3.

In this configuration, the water outlet line 50 sends the water for subsequent treatment. In its turn, the water recycling line 51 is responsible for directing the water recovered from the separating vessel 3 so that it is fed back into the separating vessel 3 by the means for injecting a mixture of pressurized gas and water 7. The water recycling line 51 may also comprise a water recycling valve 52 for controlling the stream of recycled water 52. The valve 52 can be used to control the flow or volume of water to be fed back into the separating vessel 3.

The multiphase separator can also comprise a means for injecting pressurized water in a downward angled direction 8 towards the lower portion of the separating vessel 3. In other words water can be injected downwards, towards the bottom of the separating vessel 3. This can be provided as part of a cleaning system 8, which can be provided in the lower portion of the separating vessel 3. Positioning the clearing system 8 in the lower portion of the separating vessel (i.e. just above the bottom) ensures that as much of the power from the injected water as possible is used to move the collecting solids. The multiphase separator can also comprise a means 14 for collecting solid material deposited in the lower part of the separating vessel 3, such as a solids collection system. Thus, the multiphase separator described can also perform the function of cleaning solid debris from the separating vessel 3.

The means 14 for collecting solid material deposited in the lower part of the vessel 3 may comprise an opening in the lowest portion of the separating vessel 3, wherein this opening may be opened and/or closed at predetermined times according to each application.

The water used by the means for injecting pressurized water in a downward angled direction 8 towards the bottom of the separating vessel 3 may be from an external source. Alternatively, water collected by the means for collecting a volume of water 5 separated from the multiphase fluid may be used. The second option can be adopted in order to reduce the water consumption and reduce the number of pieces of equipment and tanks used.

Thus, as the system comprises both (i) the means for injecting a mixture of pressurized gas and water 7 in a lower portion of the separating vessel, and (ii) the means for injecting pressurized water in a downward angled direction 8 towards the bottom of the separating vessel 3, the system is capable of both increasing the efficiency in separation of the phases of the fluid introduced into the separating vessel (by operating in a flotation mode, using the means the for injection a mixture of pressurized gas and water 7), and providing cleaning of the separating vessel (using the cleaning system 8), removing solid particles from this separating vessel, without needing to interrupt production.

The operation of the device described in the preceding paragraphs will be presented in greater detail below. In addition, specific configurations and additional elements will be described.

The multiphase separator can be programmed for operating as flotation plant (aiding separation of the multiphase fluid) or in cleaning mode (removing solid debris from the separating vessel). In both cases, the multiphase separator can comprise a pump, such as an inductor pump 6 (or dissolved gas flotation, DGF, pump), for exerting pressure on the water/gas mixture or on the water.

Thus, the gas recycling line 10 and water recycling line 51 feed the pump 6. Similarly, the pump 6 is responsible for supply both to the means for injecting a mixture of pressurized water and gas 7, and to the means for injecting pressurized water 8 in the separating vessel 3.

Flow control valves 12, 52 are employed in the lines that connect the pump 6 to the means for injecting a mixture of pressurized water and gas 7, and to the means for injecting pressurized water 8 in the separating vessel 3. Thus, these valves 12, 52 are responsible for controlling (allowing or blocking) the flow to these elements.

When the multiphase separator is acting as flotation plant, the inductor pump 6 receives water sent by the water recycling line 51 together with gas from the gas recycling line 10, whose flow rate is controlled by the gas feed control valve 12. This pump raises the level of pressure of the fluids and sends them to the means for injecting a mixture of water and gas 7. This injection assists separation of the water and oil in the separating vessel, according to known flotation processing.

In this configuration, both the flow control valve of the gas recycling line 12 and the flow control valve of the water recycling line 52 operate in an at least partially open state.

The flow control valve 70 connected to the sprinklers (or other means for injecting a mixture of water and gas 7) can remain in its open position, to allow feed of these elements. This valve 70 will operate in the NO (normally open) mode. This is so that flotation takes place continuously. Usually, the valve 70 will only have to be blocked at times when the vessel is not operating, or when the line and the blocking valve of the cleaning system 8 (described in more detail below) are in operation.

The water containing gas (in solution or induced) will then be sent to the flotation system with sprinklers or injector nozzles (or other means for injecting a mixture of water and gas 7). This system can have a maximum longitudinal length corresponding to the length of the vessel 3, minus the length of the oil chamber 31. This length can take into account the possibility of remixing in the water separation zone, and may be shortened if it is judged necessary. It is emphasized that the length of this element may be variable, so that this feature does not represent a factor limiting the proposed invention.

Figure 3:
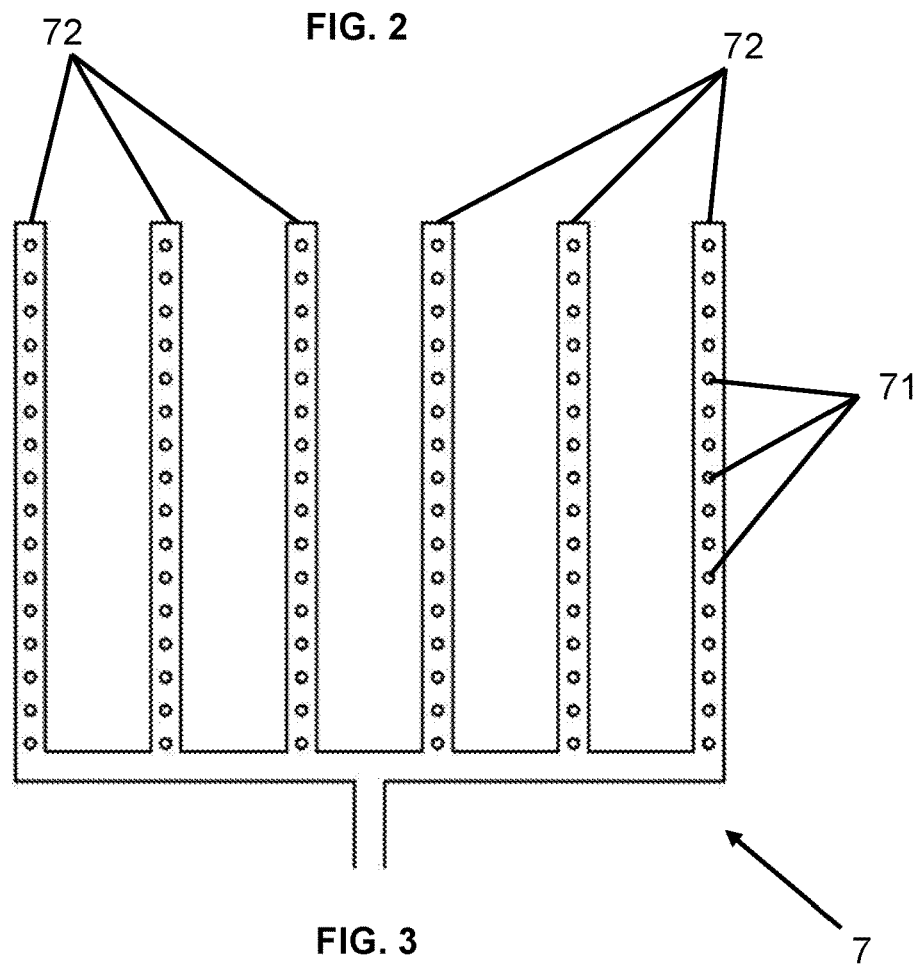
FIG. 3 shows an optional configuration of a means for injecting a mixture of pressurized gas and water according to an optional configuration.

FIG. 3 shows an optional configuration of a means for injecting a mixture of pressurized gas and water 7 according to an optional configuration. It should be noted that in this configuration, this element comprises at least one line 72 comprising sprinklers. In embodiments such as the one shown, a plurality of lines 72 comprising sprinklers is employed.

The number of lines 72 containing sprinklers or injector nozzles can be determined for each individual application, with the diameter of the separating vessel 3 as the basic parameter dictating what is possible. The number and the diameter of the orifices of the sprinklers 71, as well as their shape, may vary in each application, so that these features do not represent a factor limiting the scope of the invention.

When the device is operating in vessel cleaning mode, only water is supplied to the means for injecting pressurized water 8 in a downward angled direction towards the bottom of the separating vessel. As already described, the water may be derived from an external source, or may be water collected by the device itself.

The means for injecting pressurized water in a downward angled direction 8 towards the bottom of the separating vessel 3 may be referred to as the cleaning system. As such, it will be apparent that the cleaning system 8 is separate from the gas and water mixture injector 7, which is not a cleaning system. Both the cleaning system and the gas and water mixture injector 7 may be fed by pump 6, but they perform different functions and thus are configured differently, even if they appear superficially similar. The purpose of the cleaning system 8 is to spray high pressured water at the bottom of the separating vessel 3 to move solids that have collected there to the solids collecting means 14. In contrast, the gas and water mixture injector 7 assists the operation of the separating vessel as a flotation plant as discussed above. As such, the nozzles of the gas and water mixture injector 7 may be directed upwards and designed to disperser bubbles through the inlet chamber 32.

As illustrated in FIG. 1, the water used by the cleaning system 8 is derived from the device itself, and in this case the gas flow control valve 12 will be in the closed position, preventing the flow of recycled gas. In its turn, the water flow control valve 52 will be in its open position. Thus, the pump 6 will only pressurize the water stream before supplying pressurized water to the cleaning system 8.

In this position, the flow control valve 70 connected to the sprinklers will be in its closed position, preventing flow to the sprinklers 7.

In its turn, the flow control valve 80 connected to the cleaning system 8 will be in its open position. This valve 80 can act in NC (normally closed) mode. When in cleaning operation, the water at high pressure will be sent to the cleaning system 8.

Figure 2:
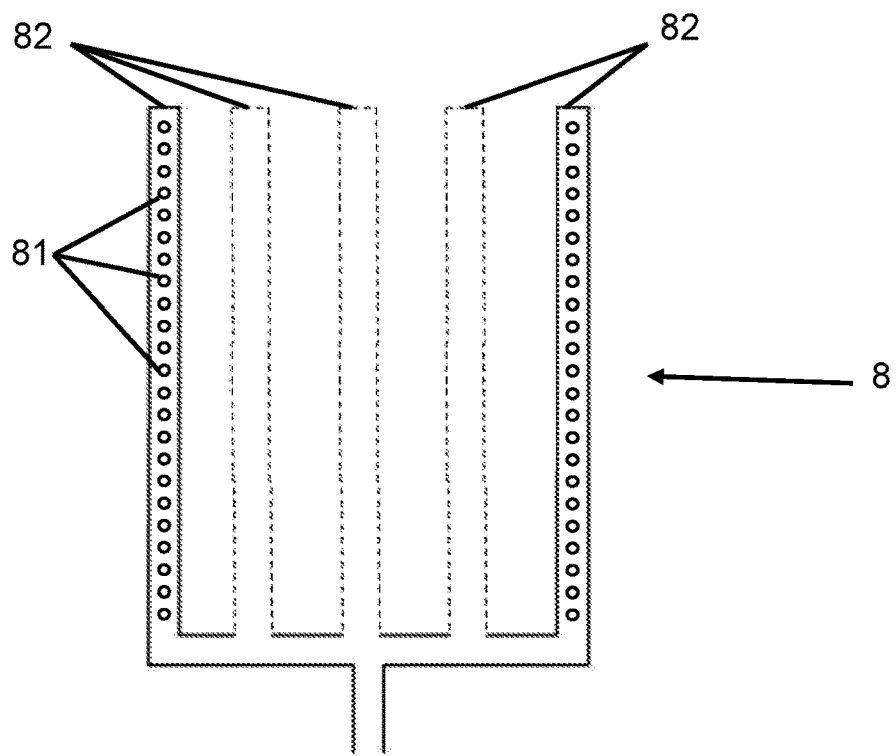
FIG. 2 shows an optional configuration of the means for injecting pressurized water in a downward angled direction of the lower portion of the separating vessel.

FIG. 2 shows an optional configuration of the means for injecting pressurized water in a downward angled direction 8 towards the bottom of the separating vessel. It can be seen that this element 8 comprises at least one pipeline 82 which can be provided with a plurality of injector nozzles 81 for high-pressure water. That water can be angled via the injector nozzles so as to direct the swept flow of water within the vessel to the means 14 for collecting solid material deposited in the lower part of the separating vessel. Some pipelines 82 are shown in dashed lines in FIG. 2 to emphasise that the number of pipelines 82 is not fixed.

Although the angled injector nozzles 81 and the means 14 for collecting solid material deposited in the lower part of the separating vessel 3 are each illustrated in one specific arrangement, it is assumed that a person skilled in the art would be able to define the best configuration of these elements, as required.

For example, the means 14 for collecting solid material deposited in the lower part of the separating vessel 3 can comprise a collecting channel. The collecting channel 14 may also comprise one or more injector nozzles responsible for propelling the solids/dirt collected in the channel 14. The solids may be propelled to an outlet nozzle, for example, where it will be possible to install a collecting system provided with cyclones or a vessel with filters for retaining solid particles that will be safely disposed of with concentrated solids.

The length of the injection system can cover longitudinally the entire bottom of the separating vessel for maximum possible removal of decanted solids. This can be combined with the possibility of installing nozzles in the side of the vessel and/or in the collecting channel.

Based on the above description, the present disclosure also provides a method of separating a multiphase fluid produced in one or more oil wells. The method can comprise the steps of: introducing the multiphase fluid into a separating vessel; collecting gas, separated from the multiphase fluid, from an upper part of the separating vessel; collecting a volume of oil from the oil chamber, the oil having separated from the multiphase fluid in an intermediate part of the separating vessel; and collecting a volume of water separated from the multiphase fluid in a lower part of the separating vessel.

The method can further comprise a step of injecting a pressurized mixture of collected gas and collected water in a lower portion of the separating vessel. This can be as part of a flotation operation or step.

The method can comprise injecting pressurized water in a downward angled direction towards the bottom of the separating vessel, and collecting solid material deposited in the lower portion/on the bottom of the separating vessel. This can be as part of a cleaning operation or step.

This can solve the problems of the prior art discussed above, i.e. it provides a system for primary separation of petroleum that makes it possible to carry out periodical cleaning of the separating vessel without needing to open the vessel, and promotes flotation of the oil droplets in water, increasing the efficiency of separation of the separating vessels, and reducing the need for water treatment equipment downstream.

Numerous variations falling within the scope of protection of the present application are permitted. This reinforces the fact that the present invention is not limited to the particular configurations/embodiments described above. Modifications of the above-described apparatuses and methods, combinations between different variations as practicable, and variations of aspects of the invention that are obvious to those of skill in the art are intended to be within the spirit and scope of the claims.

The invention claimed is:

1. Multiphase separator for separating a multiphase fluid produced by one or more oil wells, the multiphase separator comprising:

a separating vessel, comprising an inlet chamber and an oil chamber for collecting oil at least partially separated by a barrier;

an inlet for introducing the multiphase fluid into the separating vessel; wherein the oil chamber is positioned on the opposite side of the barrier to the inlet;

a gas outlet configured to collect gas separated from the multiphase fluid;

an oil outlet configured to collect oil, separated from the multiphase fluid, from the oil chamber;

a water outlet configured to collect water separated from the multiphase fluid;

a gas and water mixture injector configured to inject a mixture of pressurized gas and water in a lower portion of the separating vessel;

a solids collection system for collecting solid material deposited at the bottom of the separating vessel; and a cleaning system configured to inject pressurized water in a downward angled direction towards the bottom of the separating vessel to direct a swept flow of water to the solids collection system;

wherein the gas outlet comprises a gas recycling line connected to the gas and water mixture injector;

wherein the gas recycling line comprises a gas recycling valve configured to control the flow of recycled gas to control the volume of gas to be fed back into the separating vessel;

wherein the gas outlet comprises a gas outlet line; and wherein the gas outlet line comprises a gas outlet control valve configured to control the internal pressure of the separating vessel.

2. Multiphase separator according to claim 1, further comprising a water recycling line configured to receive water from the water outlet and to supply the received water to the cleaning system.

3. Multiphase separator according to claim 1, wherein the barrier extends from the bottom of the separating vessel up to an intermediate height within the vessel.

4. Multiphase separator according to claim 1, wherein the water outlet comprises a water outlet line.

5. Multiphase separator according to claim 1, wherein the water outlet comprises a water recycling line configured to recycle water to the gas and water injector.

6. Multiphase separator according to claim 5, wherein the water recycling line comprises a water recycling control valve.

7. Multiphase separator according to claim 1, wherein the gas outlet comprises a gas recycling line connected to the gas and water mixture injector;

wherein the water outlet comprises a water recycling line configured to recycle water to the gas and water injector; and further comprising a pump connected to the gas recycling line and to the water recycling line.

8. Multiphase separator according to claim 7, wherein the pump is configured to impart pressure to flows intended for the gas and water mixture injector, and for the cleaning system.

9. Multiphase separator according to claim 1, wherein the gas and water mixture injector comprises sprinklers and/or injector nozzles.

10. Multiphase separator according to claim 9, wherein the gas and water mixture injector comprises at least one line of sprinklers.

11. Multiphase separator according to claim 1, further comprising a mixture flow control valve configured to control the flow supplied to the gas and water mixture injector.

12. Multiphase separator according to claim 1, further comprising a cleaning flow control valve configured to control the flow supplied to the cleaning system.

13. Multiphase separator according to claim 1, wherein the cleaning system comprises at least one pipeline provided with a plurality of injector nozzles angled downwards for injecting high-pressure water.

14. Multiphase separator according to claim 1, wherein the solids collection system comprises a collecting channel.

15. Multiphase separator according to claim 14, wherein the collecting channel comprises one or more injector nozzles for propelling solids collected in the channel.

16. Method of separating a multiphase fluid produced in one or more oil wells with the multiphase separator according to claim 1, comprising the steps of:
   introducing the multiphase fluid into a separating vessel; collecting gas, separated from the multiphase fluid, from an upper part of the separating vessel;
   separating oil from the multiphase fluid into an oil chamber, and collecting the oil; and
   collecting water separated from the multiphase fluid;
   injecting a pressurized mixture of gas water in a lower portion of the separating vessel.

17. Method according to claim 16, wherein the step of injecting comprises injecting a pressurized mixture of at least some of the collected gas and at least some of the collected water.

18. Method according to claim 16, further comprising the steps of:
   injecting pressurized water in a downward angled direction towards a bottom of the separating vessel; and
   collecting solid material deposited at the bottom of the separating vessel.

19. Method according to claim 18, wherein the water injected in a downward angled direction is at least some of collected water.

20. Method of separating a multiphase fluid produced in one or more oil wells with the multiphase separator according to claim 1, comprising:
   introducing the multiphase fluid into the separating vessel; collecting gas, separated from the multiphase fluid, from an upper part of the separating vessel;
   separating oil from the multiphase fluid into the oil chamber, and collecting the oil; and
   collecting water separated from the multiphase fluid; and
   injecting a pressurized mixture of gas water in a lower portion of the separating vessel;
   wherein the separating vessel is part of the multiphase separator.

* * * * *